United States Patent [19]

Csorba et al.

[11] Patent Number: 4,642,987
[45] Date of Patent: Feb. 17, 1987

[54] PROCESS AND EQUIPMENT FOR THE UTILIZATION OF GEOTHERMIC ENERGY

[75] Inventors: István Csorba; Lajos Székely; Sándor Bódás, all of Budapest, Hungary

[73] Assignee: Melyepitesi Tervezo Vallalat, Budapest, Hungary

[21] Appl. No.: 579,809

[22] Filed: Feb. 13, 1984

[30] Foreign Application Priority Data

Feb. 14, 1983 [HU] Hungary .................. 484/83

[51] Int. Cl.$^4$ .................................. F03G 7/04
[52] U.S. Cl. .......................... 60/641.2; 165/45
[58] Field of Search ............ 60/641.2, 641.3; 165/45, 115

[56] References Cited

U.S. PATENT DOCUMENTS

| 3,817,038 | 6/1974 | Paull et al. | 60/641.2 |
| 3,857,244 | 12/1974 | Faucette | 60/641.2 |
| 3,957,108 | 5/1976 | Van Huisen | 60/641.2 X |
| 4,452,303 | 6/1984 | Bontje et al. | 165/45 X |

FOREIGN PATENT DOCUMENTS 7905625  1/1981  Netherlands .............. 60/641.2

Primary Examiner—Stephen F. Husar
Attorney, Agent, or Firm—Handal & Morofsky

[57] ABSTRACT

Process and equipment serving for the utilization of geothermic energy. In the course of the process water is introduced in a vapor producing pipe driven into the rock under the terrain and by making use of the geothermic heat, water is evaporated and the vapor is utilized such as for the generation of electrical energy. A superatmospheric pressure is set in the vapor producing pipe and a liquid (heat carrying medium) is let to trickle down in the tube, the saturated vapor of which contains 1000 kJ/m$^3$ of latent heat of evaporation at the adjusted superatmospheric pressure. The equipment includes a vapor producing pipe embedded in the rock under the terrain, a liquid feeding device connected to the upper end of the vapor producing pipe as well as a device to serve for transforming the energy of the extracted vapor. The liquid feeding device comprises a distribution vessel, in which there is an annular spillway directing the liquid in a film-like layer on the inner surface of the vapor producing pipe and enclosing the opening of the distribution vessel ending in the vapor producing pipe.

12 Claims, 2 Drawing Figures

PROCESS AND EQUIPMENT FOR THE UTILIZATION OF GEOTHERMIC ENERGY

FIELD AND BACKGROUND OF THE INVENTION

The invention relates to a process and apparatus employed for the utilization of geothermic energy.

Attempts to utilize the heat contents, the geothermic energy, of dry rocks are well known. According to the "two-well" method water is pressed through one of the wells into the rock while the warmed up water is removed through the other pipe and this may be called an "artificial thermal water production". Of course, there is provided a hydraulic connection between the two wells, e.g. fissures, caves should be formed by blast. In order to achieve that the lower end points of the wells be near each other directional well drilling is applied.

The process according to the Hungarian Patent No. 165.379 is based upon such "artificial thermal water producing" principle, according to which a well structure appropriate for the heat output is suggested, namely, the storage area is a part of the bore hole and is protected by a casing pipe, and separated from the geothermal layer by a blocking piece, while the uptake area is an insulated producing pipe built into the casing. The flow from the annular area toward the producing pipe is provided by a pumping unit.

The disadvantage of the above procedures resides in that they are rather expensive. This is mainly due to the fact that owing to the steady pumping there is a high rate of power consumption and, on the other hand, a heavy insulation is necessary otherwise the medium exploited will return its heat back to fed in medium, still below the terrain.

An efficient insulation has, however, a large space requirement, consequently it will further reduce the cross section of flow which is small anyway. Due to this the power requirement of pumping necessary for the recirculation will further increase. Should a two-well method be applied, where the heating up of the water takes place in direct contact with the natural rocks, the disadvantage is well known that the water exploited, just like in the case of thermal waters, may include undesired minerals and even scale formations may be present.

In an attempt to eliminate the drawbacks associated with the one-well method mentioned above (heat exchange between the external and internal pipes, expensive insulation as well as pumping) proposals have become known, according to which the evaporation heat which is the difference in heat contents between the liquid fed in and the vapor exploited, both of the same temperature, should be utilized.

The rational realization of such processes is strongly impeded by the fact that the pressure of the liquid column is increasing with depth and, as a result, vapor can be produced in a rather small quantity. The same refers to the process published in the Hungarian application for patent No. SE-1710, the essence of which is that liquid is introduced to the inner mantle surface of the steam producing pipe heated up by geothermic energy where it is let run down. Accordingly, a pressure necessary for evaporation is intended to be produced through the entire depth of the well structure.

A drawback of the method lies in its functioning at an almost atmospheric pressure or under vacuum (the surface fittings thereof are conforming thereto; it has a vacuum pump and has no blow-off valve) requiring a considerable vapor rate even in the event of smaller output. As a result, the so called separation tube should be built in in order to separate the vapor-phase, however, the output is limited even in such case.

A further problem in connection with the separation tube resides in the liquid's transfer from the inner surface of the vapor producing pipe, made more difficult by any structural assymetry, into the separation tube and remaining there in this form, as there is no way to return it to its destination.

From the structural point of view it is a disadvantage that the liquid is introduced onto the tube wall by a nozzle which, due to the spraying effect, does not provide for a uniform spreading.

Ultimately, a further drawback resides in that there is no proper heat transfer assured between the well structure and the rocks, therefore, the output, one could expect, is not the best.

SUMMARY OF THE INVENTION

It is an object of the invention to provide a method for the utilization of geothermic power based upon the transformation of the liquid medium into vapor, which is free from the disadvantages of the presently existing processes as detailed above, namely from the consequences of a too high vapor rate, from the problems raised by the presence of the separation pipe as well as from the harmful effects of the insufficient heat transfer between the well structure and the rocks.

The invention is based upon the realization that by setting a proper superatmospheric pressure in the well and selecting a suitable heat-carrying medium, there may be a specific evaporation heat of the saturated vapor attained by being high enough to deliver the heat that may be extracted from the rocks at such a low speed at which the flow of the fluid opposed to that of the vapor can still take place and, at the same time, the pressure loss of flow, compared to the superatmospheric pressure set, may be neglected. Consequently, there is no need for a separation tube, disturbing or impeding the operation, while the vapor pressure together with the vapor temperature of saturation, may be regarded practically constant over the entire length of the well, is a prerequisite for making complete use of the heat quantity that may be extracted from the rocks at a given outlet temperature.

According to the above, the object of the invention has been solved, by a process in which liquid is introduced in the steam producing pipe driven in the rock under the terrain, the liquid is then evaporated by making use of the geothermic heat and the steam is used, for example, for the production of electric energy, and wherein a pressure exceeding the super atmospheric pressure is adjusted in the steam producing pipe and a liquid, heat-carrying medium, is let trickle down in the pipe, the saturated steam of which at the set superatmospheric pressure has a specific evaporation heat at least $1000/kJ/m^3$.

As a result, the amount of heat extractable from the rocks may be produced by a relatively small vapor volume, that is, by a low steam rate and, there is no built-in separation pipe as it is necessary only with high steam rates.

It is rather advantageous that the liquid fed in and the medium exploited are of the same temperature, namely the saturation temperature of the medium at the given pressure. The superatmospheric pressure is set by abstracting a predetermined amount of heat from the outlet steam; i.e. the superatmospheric pressure is a function of the amount of heat extracted.

The amount of heat abstracted (utilized) can be set prior to the adjustment of the self-regulation plant (see later) by means of trial.

According to another aspect of the invention, a certain liquid is let to trickle down, the boiling point of which is associated with the highest possible equilibrium pressure at a given geothermic temperature, and is usually between 50° to 150° C., which is within the pressure maintaining capacity of the well structure and of the surface installations of utilization, and at the same time, it possesses the highest possible latent evaporation heat. Under these conditions, a large output may be attained even at low velocity of steam.

As a further aspect of the invention, ammonia ($NH_3$) and/or different grades of freon (e.g. F12, F22) and/or hydrocarbons (e.g. $C_3H_6$, $C_3H_8$) are used as heat-carrying media up to well temperatures of 100° to 120° C. Should the well temperature exceed 120° C., the use of water as heat carrier is advisable.

"Well temperature" is to be understood as the inner temperature of the well which is practically constant over the entire length of the well, that is, over that of the vapor producing pipe. The well temperature depends on one hand, on the depth of the well, and on the other hand, it is a function of the pressure produced therein.

According to another way of implementation of the inventive process, the condensate nascent in the course of utilization, is returned to the vapor producing pipe within the framework of a closed system, thus the operation of the equipment is made self-controlled.

A still further aspect of the invention resides in that if the vapor producing pipe is located by a spacing within the pipe liner (casing pipe) and, the pipe liner is opened in the layer region comprising thermal water, whereupon thermal water is first led into the annular area between the vapor producing pipe and the pipe liner and then to the surface, so the vapor producing pipe, at least the upper section thereof, is heat insulated and, the removed thermal water becomes utilized.

Regarding the optimum utilization of heat, it is advantageous according to the invention, if at least the porosities e.g. caves, pores, fissures, etc. of the rocks enclosing the vapor producing reaction of the vapor producing pipe, are filled with an afterhardening substance of good thermal conductivity.

An afterhardening substance of excellent heat conduction characteristics is obtained by mixing a hydraulic binder (e.g. cement powder), with an additive of good thermal conductivity (e.g. carbon powder), with water, as well as with other additives, if necessary, (e.g. concrete plasticizer, retardant, etc.).

It is also advantageous according to the present invention, to crack the range of the rock, for filling with a material of excellent thermal conductivity, by blast and/or in a hydraulic manner, or otherwise, and to let the afterhardening substance of good thermal conductivity to get to the pores of the rock by injection.

A further implementation of the inventive process is characterized by letting the water trickle down on the inner surface of the vapor producing pipe and/or in a film-like layer over the filling placed into the vapor producing pipe to an extent providing for the unimpeded upstream flow for the vapor and, supporting it internally on fillings formed by Raschig-rings or similar structures.

The equipment according to the invention comprises a vapor producing pipe embedded in rock under the ground, a feed structure for liquid connected to the upper end of the vapor producing pipe, a vapor outlet pipe, and a device to convert the energy of the extracted vapor, wherein the liquid feeding device comprises a distribution vessel in which there is a ring-shaped spillway enclosing the opening of the vapor producing pipe discharging into a distribution vessel and serving for conducting the liquid in a film-like layer to the internal surface of the vapor producing pipe.

BRIEF DESCRIPTION OF THE DRAWINGS

The invention is disclosed in details on the basis of the attached drawing illustrating examples of preferred embodiments with reference to the drawings, in which.

DESCRIPTION OF THE PREFERRED METHOD AND EMBODIMENTS

Figure 1:
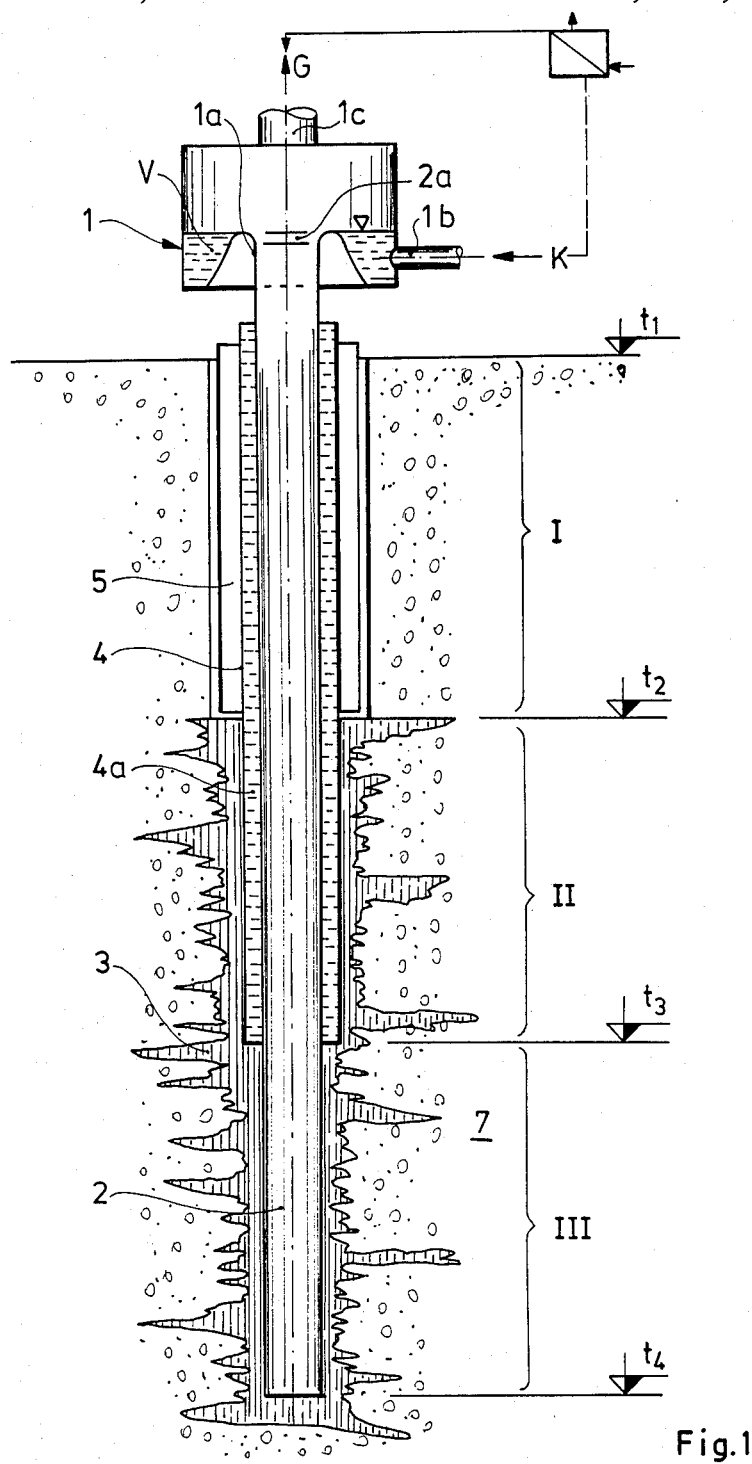
FIG. 1 is an embodiment of the invention in schematic vertical longitudinal section, on a reduced scale, where the well is embedded in its whole length in dry rock.

The well seen in FIG. 1 has a vapor producing pipe 2 of solid wall, namely the inner area of the pipe is tightly closed from the rocks 7.

The upper end of the vapor producing pipe 2 is connected to a distribution vessel 1. Also an opening 2a of the vapor producing pipe 2 ending at the distribution vessel 1 is enclosed by a ring-shaped spillway 1a conducting the liquid of the level V to the internal mantle surface of the vapor producing pipe 2, so that liquid trickles down on the mantle surface in a film-like manner. The liquid can practically be introduced tangentially into the cylindrical vessel 1 by a pipe stub 1b. A pipe stub 1c serves as a vapor outlet.

In FIG. 1 there are other levels under the ground level $t_1$, namely levels $t_2$, $t_3$ and $t_4$, respectively. Section I of the well is located between levels $t_1$ and $t_2$, section II between levels $t_2$ and $t_3$, while section III between levels $t_3$ and $t_4$. Sections II and III have been separated from each other only by the piping technology used. The entire length of the well, that is, the total length of sections from I to III, ranges from 800 to 4000 meters.

Depending on the prevailing geological situation, temperatures from 50° to 80° C. are associated with depth of 800 m, while those from 180° to 200° C. with a depth of 4000 m, respectively. The change in temperature between the lower and upper limits is nearly linear, or rather it is a function of the geological conditions.

The vapor producing pipe 2 is enclosed in sections I and II by a pipe liner 4. The space between the vapor producing pipe 2 and the pipe liner 4 is filled with a heat conductor 4a (mostly in section II), which may be either in a solid or liquid state, e.g. hot water.

Of course, if the pipe liner should be a solid one, then the area between the vapor producing pipe and the pipe liner should be closed for keeping the water.

In section I the pipe liner 4 is surrounded from the outside by a further insulating structure 5, as the temperature of the rock, or of the soil is so low, as a result of which an efficient functioning of the well would strongly deteriorate.

The well's vapor producing part is formed by sections II and III along which the porosities of rock 7 adjacent to the well structure e.g. cavities, fissures, pores, etc. are filled according to the invention with an afterhardening material of excellent thermal conductivity. A flowing mixture that may be injected, such as pumped, composed by hydraulic binder (e.g. cement powder); water, an additive of excellent thermal conductivity (e.g. carbon powder) and of other additives (e.g. concrete plasticizer, retardant, etc.) can be used as such material.

It is advisable to use a hydraulic binder and an additive of good thermal conductivity having uniform grain size and density so that the mixture could be easily pumped before solidification.

The additive of good thermal conductivity, e.g. the carbon powder should be added to the mixture in the largest possible proportion, up to a limit which is undetrimental to the proper hydraulic properties, so as to achieve, after solidification, a contact between the granules of the heat conductor in the largest possible number. It serves better the aim of the invention if some 60 to 65% of the mixture's dry matter content is formed of a material possessing excellent thermal conductivity. If the natural conditions (e.g. thermal water present in the surrounding layer) provide also, for good thermal conductivity, the injection of mixture 3 will not be necessary. By surrounding the outer mantle of the well structure according to the above with a material having good thermal conductivity and proper strength, the heat transfer surface is increased and the stored (latent) thermal energy of a large volume of rock can be utilized.

According to the geological characteristics eventually the breaking of the well's surrounding should take place, if necessary, prior to the introduction of the afterhardening mixture, such operation can be carried out e.g. in a hydraulic manner, by blast or in any other way.

Figure 2:
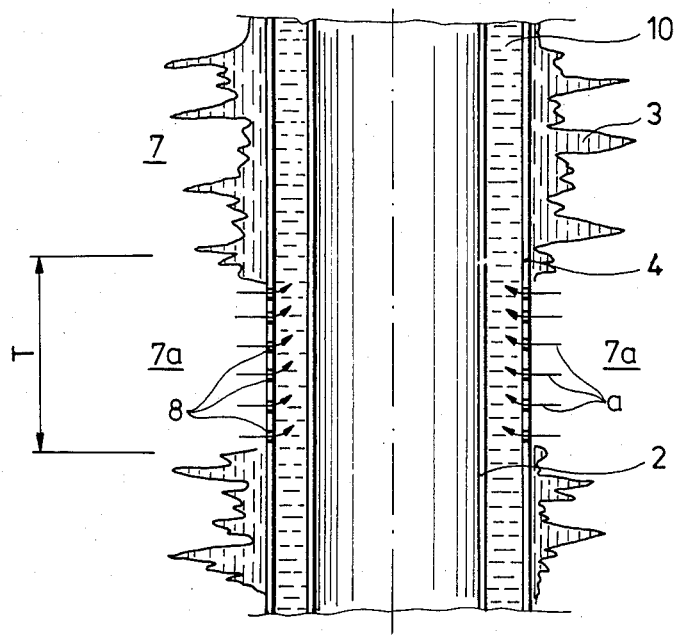
FIG. 2 is a schematic vertical longitudinal view of a well enclosed partly by thermal water and partly by dry rock.

The embodiment according to FIG. 2 is suggested in that rather frequent cases when, for example, an appr. 3000 meter deep dead oil well is opened up due to the presence of water stocks in a relatively low depth (800 to 1500 m) so as to obtain a thermal water grade of proper quality, e.g. of a temperature from 50° to 80° C.

In such case, the lower section of the well which is the most valuable regarding heat output, could remain unexploited. Should, however, pipe liner 5 in a bore hole with a diameter of (9.$\frac{5}{8}$") be opened with perforations 8 toward the water yielding layer 7a of height T and, the steam producing pipe 2 (with a diameter of 7") placed therein sealed from the pipe liner and the distribution vessel 1 connected thereto on the top as seen in FIG. 1, the utilization of the geothermic powder becomes partly solved over the complete length of the bore, the insulation of the vapor producing pipe becomes partly effected in the upper section of the well structure, by the thermal water 10.

The direction of flow of thermal water 10 in pipe 2 via perforations 8 is indicated by the arrows A. The rock regions 7 are dry, along which mixture 3 mentioned above has been introduced into the zone alongside the pipe liner 4.

On the other hand, thermal water 10 can be utilized on the surface either for energetic or for other purposes (e.g. bath water).

The equipment as per the invention (FIG. 1) operates such that the liquid heat-carrying medium is introduced via pipe stub 1b tangentially into the distribution vessel 1 (arrow K) and it gets over the annular spillway 1a into the inner mantle surface of the vapor producing pipe 2 and is let to trickle down in the form of a thin, film-like layer.

The setting of superatmospheric pressure is adjusted in the steam producing pipe 2, at which pressure liquid is transformed into vapor at the temperature prevailing in vapor producing sections II and III, and which will rise in the direction of arrow G and leaves via pipe stub 1c and the energy thereof is utilized.

The heat-carrying medium transformed into condensate, liquid, during utilization, is returned continuously via pipe stub 1b to the distribution vessel 1, accordingly, even vapor can be produced continuously.

Should the condensate of the produced vapor nascent in the course of the utilization be returned to the pipe wall within the framework of a closed system, the quantity of the condensate returned is proportional to the extraction of heat, while the length of the pipe wall moistened (namely that being apt for vapor production) is commensurate with the quantity of the condensate. The operation of the equipment is self-controlled. As there is no liquid column to load the inner area of the pipe, vapor production can take place anywhere under the ground of proper temperature.

The invention is disclosed in the following by ways of examples.

EXAMPLE 1

There is a dead oil well of a depth of 3000 meters. The vapor producing pipe has an internal diameter of 160 millimeters, the geothermic reciprocal gradient amounts to 17.5 m/° C. The inner temperature of the well is 90° C. It may be calculated that in the given case a heat flux of some 1.0 kW will form from the deeper-seated rock regions. In the vapor producing pipe there is a super-atmospheric pressure of 25.11 bars set and, a heat-carrying medium with a latent heat of evaporation matching it, namely an F12 freon is applied. The thermodynamic properties thereof at the given temperature, as well as the characteristics of fluid mechanics are as follows:

Outlet vapor temperature: 90° C.
Output: 1.0 MW
Saturation pressure: 28.11 bars
Evaporation heat: 84.81 kJ/kg
Vapor density: 177.305 kg/m$^3$
Latent heat of evaporation: 15,037.62 kJ/m$^3$
Vapor flow: 11.791 kg/s
Vapor volume flow: 0.0665 m$^3$/3
Vapor rate: 3.307 m/s
Pressure loss: 3.00 bars
Saturation temperature at the highest pressure: 93.1° C.

It follows from the above data that by the method of the invention the geothermic energy that can be obtained from the rocks, may be utilized with good efficiency. There is a steam rate applied allowing still for the reverse flow of the liquid, and the pressure loss of flow can be neglected, when compared to the set super-atmospheric pressure. Also the difference between the bottom temperature and that of the outlet vapor (well temperature) can be neglected as being basically the reason for good efficiency. The energy extracted may be used e.g. for heating.

EXAMPLE 2

The geothermic energy of a well used is the same as that in Example 1, differing, however, in that the well temperature amounts here to 70° C. In this case an superatmospheric pressure of 33.77 bars is set in the vapor producing pipe. Ammonia (NH₃) is the heat-carrying medium being the best regarding the latent heat of evaporation. The thermodynamic characteristics thereof at the given temperature and the features of fluid mechanics calculated for the above application are as follows:

Outlet vapor temperature 70° C.
Output 1.5 MW
Saturation 33.77 bars
Evaporation heat 938.84 kJ/kg
Vapor density 26.385 kg/m$^3$
Latent heat of evaporation 24,771.19 kJ/m$^3$
Vapor flow 1.598 kg/s
Vapor volume flow 0.0606 m$^3$/s
Vapor rate 3.014 m/s
Pressure loss 0.37 bar
Saturation temperature at max. pressure 70.5° C.

From the above data consequences similar to those in Example 1. can be drawn, however, there is practically a 100 percent efficiency here since there is only a 0.5° C. difference in temperature. The equipment can be used here, also for heating and hot water production.

EXAMPLE 3

A well of an increased, say 5000 meter depth is intended to be used for producing vapor of higher temperature and electric energy, respectively, according to the method of the invention. The well's vapor producing pipe has an internal diameter of 160 mm, the geothermic reciprocal gradient is 18.0 m/C° and the bottom temperature is 288C°.

There is a super-atmospheric pressure of 4.46 bars set in the well and water is applied as heat carrier having a saturation vapor pressure of 150° C. (well temperature) at the superatmospheric pressure adjusted. It may be calculated that a heat flux of some 1.5 MW is produced in this case from the deeper-seated rock regions towards the well structure. Characteristics of the fluid mechanics as well as those of the water are, at the above values of pressure and temperature, as follows:

Saturation: 4.46 bars
Evaporation heat: 2,114.17 kJ/kg
Vapor density: 2.547 kg/m$^3$
Latent heat of evaporation: 5,384.73 kJ/m$^3$
Vapor flow: 0.7095 kg/s
Vapor volumetric flow: 0.2786 m$^3$/s
Vapor rate: 13.86 m/s
Pressure loss: 1.25 bars
Saturation temperature max. pressure: 158.3 C°

The advantage of the invention lies in its providing for the utilization of the geothermic energy with optimum efficiency and without the need of energy for pumping. Moreover, it assures that an energy source which is still not or has been insufficiently exploited, can be included into the power production.

Of course, the invention is not limited to the exemplary embodiments detailed above and to the forms of execution of the equipment, since it can be realized in several manners within the sphere of protection defined in the patent claims.

Although the invention has been described in its preferred form with a certain degree of particularity, it will be understood that the present disclosure of the preferred embodiment has been made only by way of example and that numerous changes may be resorted to without departure from the true spirit and scope of the invention as hereinafter claimed. It is intended that the patent shall cover, by suitable expression in the appended claims, whatever features of patentable novelty exist in the invention disclosed.

What is claimed is:

1. Process for the utilization of geothermal energy wherein a vapor producing pipe is set in the rock under the terrain in contact with a source of geothermal heat, a superatmospheric pressure is set in the vapor producing pipe and a liquid heat carrying medium is let trickle down in a film-like layer on the pipe walls the saturated vapor of which is containing a latent heat of evaporation of at least 1000 kJ/m$^3$ at the set superatmospheric pressure, said liquid becoming evaporated by the geothermic energy and extracted at the head of the vapor producing pipe.

2. Process according to claim 1 wherein said liquid is being let to trickle down in the vapor producing pipe to a region the boiling point of which at the given geothermic temperature is in a range usually from 50° to 150° C.

3. Process according to claim 1, wherein up to well temperatures to 100°−120° C. ammonia (NH₃) or different grades of freon (F12, F22) or hydrocarbons (e.g. C₃H₆, C₃H₈) are used as heat-carrying medium.

4. Process according to claim 1 wherein water is used above well temperatures of 120° C. as heat-carrying medium.

5. Process according to claim 1, wherein the condensates nascent during the utilization is returned in the vapor producing pipe in a closed system.

6. Process according to claim 1, wherein said vapor producing pipe is placed by spacing within a pipe liner and the pipe liner is traversing a layer containing thermal water, the pipe liner is opened in the zone of the layer containing the thermal water, and the thermal water is introduced into the annular spacing between the vapor producing pipe and pipe liner and therefrom to the surface, thereby at least the upper section of the vapor producing pipe is heat insulated by thermal water, and removing and utilizing the thermal water.

7. Process according to claim 1 wherein the porosities, cavities, pores, fissures, of the rock surrounding at least the steam producing section (II, III) of the steam producing pipe are filled with an afterhardening mixture of good thermal conductivity.

8. Process according to claim 7 wherein the afterhardening mixture of good thermal conductivity is made by mixing a hydraulic binder, an additive of excellent thermal conductivity, water and other additives.

9. Process according to claim 7, wherein the region of the rock to be filled with a mixture of good thermal conductivity is broken up by blast or in a hydraulic manner.

10. Process according to claim 7 wherein the afterhardening mixture of excellent thermal conductivity is introduced in the porosities of rock by injection.

11. Process according to claim 1, wherein said liquid is being let trickle down on the inner surface of the vapor producing pipe in a film-like layer over at filling placed in the vapor producing pipe for supporting internally the vapor producing pipe, said fillings comprising Raschig-rings.

12. Equipment for the utilization of geothermal energy comprising a vapor producing pipe embedded in the rock under the terrain in contact with a source of geothermal heat; a liquid feeding device connected to the upper end of the vapor producing pipe, a vapor outlet pipe, wherein a liquid feeding and vapor collecting vessel (1) comprises an annular spillway (1a) for introducing the liquid on the inner surface of the vapor producing pipe (2) in a film-like layer and said vessel surrounding the opening (2a) of the vapor producing pipe (2), said vapor producing pipe being connected to the vapor collecting vessel (1).

* * * * *